United States Patent
Zarkovsky et al.

(10) Patent No.: US 11,757,558 B2
(45) Date of Patent: Sep. 12, 2023

(54) SYSTEMS, DEVICES, AND METHODS FOR DUAL POLARIZATION RECOVERY

(71) Applicant: MELLANOX TECHNOLOGIES, LTD., Yokneam (IL)

(72) Inventors: Segev Zarkovsky, Tel Aviv (IL); Thomas H. Greer, III, Chapel Hill, NC (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/481,624

(22) Filed: Sep. 22, 2021

(65) Prior Publication Data
US 2023/0090061 A1     Mar. 23, 2023

(51) Int. Cl.
H04J 14/06     (2006.01)
H04B 10/61     (2013.01)
H04B 10/532    (2013.01)

(52) U.S. Cl.
CPC .......... *H04J 14/06* (2013.01); *H04B 10/532* (2013.01); *H04B 10/6162* (2013.01)

(58) Field of Classification Search
None
See application file for complete search history.

(56) References Cited

U.S. PATENT DOCUMENTS

| | | | | |
|---|---|---|---|---|
| 6,483,620 | B1* | 11/2002 | Epworth | H04B 10/2569 398/154 |
| 2004/0202480 | A1* | 10/2004 | Weid | G02B 6/274 398/147 |
| 2007/0280689 | A1* | 12/2007 | Boffi | H04J 14/06 398/65 |
| 2020/0153509 | A1* | 5/2020 | Chen | H04B 10/1143 |

* cited by examiner

*Primary Examiner* — Darren E Wolf
(74) *Attorney, Agent, or Firm* — Sheridan Ross P.C.

(57) ABSTRACT

A system comprises a transmitter that generates a combined signal including a first group of optical signals and a second group of optical signals, the first group of optical signals comprising M+X number of optical signals in a first polarization mode, the second group of optical signals comprising N number of optical signals in a second polarization mode, wherein the number of N and M optical signals comprise payload signals, where the X number of optical signals comprises at least one first pilot signal. The system may further include a receiver comprising a polarization recovery device that receives the combined signal and that recovers, from the combined signal, the first group of optical signals with the first polarization mode and the second group optical signals with the second polarization mode based on feedback indicative of at least one signal characteristic of the at least one first pilot signal.

20 Claims, 5 Drawing Sheets

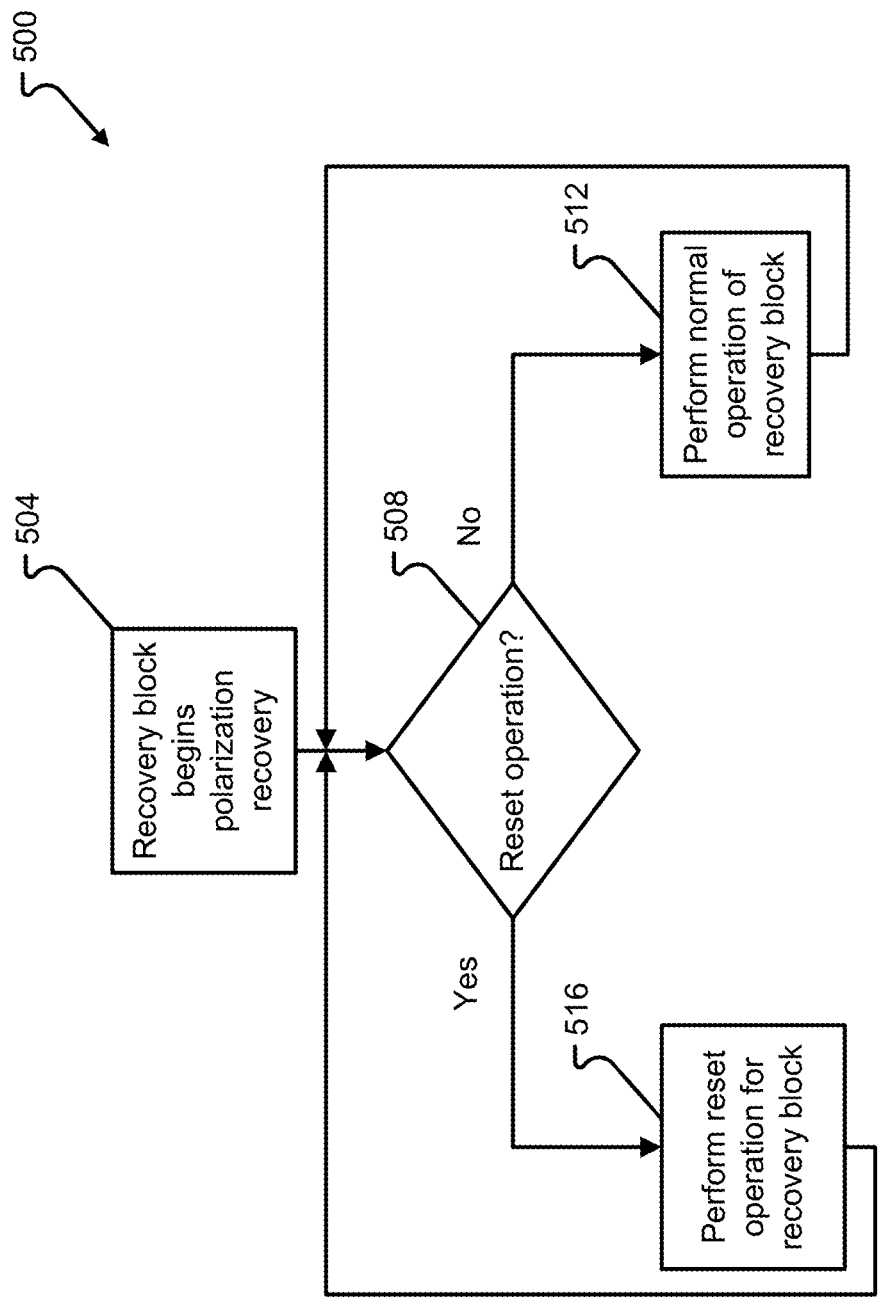

SYSTEMS, DEVICES, AND METHODS FOR DUAL POLARIZATION RECOVERY

FIELD

The present disclosure is generally directed to systems, devices, and methods for dual polarization recovery.

BACKGROUND

Optical fiber networks offer fast and generally reliable data transmission between devices. In these networks, optical transceivers and waveguides are often employed to send and/or receive light signals modulated with data. A signal sent from a transmitter to a receiver over a waveguide (e.g., an optical fiber) may be influenced by properties of the waveguide. For example, the waveguide may introduce variations in polarization of the signal as the signal traverses the waveguide from the transmitter to a receiver.

BRIEF SUMMARY

In an illustrative embodiment, a system comprises a transmitter that generates a combined signal including a first group of optical signals and a second group of optical signals, the first group of optical signals comprising M+X number of optical signals in a first polarization mode, the second group of optical signals comprising N number of optical signals in a second polarization mode, where the number of N and M optical signals comprise payload signals, where the X number of optical signals comprises at least one first pilot signal. The system may further include a receiver comprising a polarization recovery device that receives the combined signal and that recovers, from the combined signal, the first group of optical signals with the first polarization mode and the second group optical signals with the second polarization mode based on feedback indicative of at least one signal characteristic of the at least one first pilot signal. In at least one embodiment, X is equal to 1.

In at least one embodiment, the second group of optical signals comprises N+Y number of optical signals in the second polarization mode, where the Y number of optical signals comprises at least one second pilot signal, and where the feedback is further indicative of at least one signal characteristic of the at least one second pilot signal. In at least one embodiment, Y is equal to 1.

In at least one embodiment, each optical signal in the first group of optical signals has a different wavelength and each optical signal in the second group of optical signals has a different wavelength.

In at least one embodiment, the polarization recovery device further comprises a polarization rotator-splitter that splits the combined signal into a first set of signals that traverse a first path that includes a first waveguide section within the polarization recovery device and a second set of signals that traverse a second path that includes a second waveguide section within the polarization recovery device.

In at least one embodiment, the polarization recovery device further comprises one or more devices that are controlled to adjust at least one signal characteristic of the first set of signals along the first path or the second set of signals along the second path based on the feedback.

In at least one embodiment, the first polarization mode and the second polarization mode have opposite polarization orientations. The opposite polarization orientations may include one of: left and right polarization, vertical and horizontal polarization, or +45° and −45° polarization.

In another illustrative embodiment, a polarization recovery device comprises an input that receives a combined signal including a first group of optical signals and a second group of optical signals having respective unknown polarization modes, the first group of optical signals comprising M+X number of optical signals, the second group of optical signals comprising N number of optical signals, where the number of N and M optical signals comprise payload signals, where the X number of optical signals comprises at least one first pilot signal. The polarization recover device may include a recovery block that recovers, from the combined signal, the first group of optical signals with a first polarization mode and the second group of optical signals with a second polarization mode based on feedback indicative of at least one signal characteristic of the at least one first pilot signal. The polarization recovery device may further include an output that outputs the first group of optical signals with the first polarization mode and the second group of optical signals with the second polarization mode. In at least one embodiment, X is equal to 1.

In at least one embodiment, the second group of optical signals comprises N+Y number of optical signals in the second polarization mode, where the Y number of optical signals comprises at least one second pilot signal, and where the feedback is further indicative of at least one signal characteristic of the at least one second pilot signal. In at least one embodiment, Y is equal to 1.

In at least one embodiment, each optical signal in the first group of optical signals has a different wavelength and each optical signal in the second group of optical signals has a different wavelength.

In at least one embodiment, the polarization recovery device further comprises a polarization rotator-splitter that splits the combined signal into a first set of signals that traverse a first path that includes a first waveguide section within the polarization recovery device and a second set of signals that traverse a second path that includes a second waveguide section within the polarization recovery device.

In at least one embodiment, the polarization recovery device further comprises one or more devices that are controlled to adjust at least one signal characteristic of the first set of signals along the first path or the second set of signals along the second path based on the feedback.

In at least one embodiment, the first polarization mode and the second polarization mode have opposite polarization orientations. The opposite polarization orientations may include one of: left and right polarization, vertical and horizontal polarization, or +45° and −45° polarization.

In an illustrative embodiment, a method comprises receiving a combined signal including a first group of optical signals and a second group of optical signals having respective unknown polarization modes, the first group of optical signals comprising M+X number of optical signals, the second group of optical signals comprising N number of optical signals, where the number of N and M optical signals comprise payload signals, and where the X number of optical signals comprises at least one first pilot signal. The method may include recovering, from the combined signal, the first group of optical signals with a first polarization mode and the second group of optical signals with a second polarization mode based on feedback indicative of at least one signal characteristic of the at least one first pilot signal. The method may include generating output that includes the first group of optical signals with the first polarization mode and the second group of optical signals with the second polarization mode. In at least one embodiment, the method includes extracting data from the first and second groups of optical signals based the output.

Additional features and advantages are described herein and will be apparent from the following Description and the figures.

BRIEF DESCRIPTION OF THE DRAWINGS

FIG. 5 illustrates a method according to at least one example embodiment.

DETAILED DESCRIPTION

Figure 1:
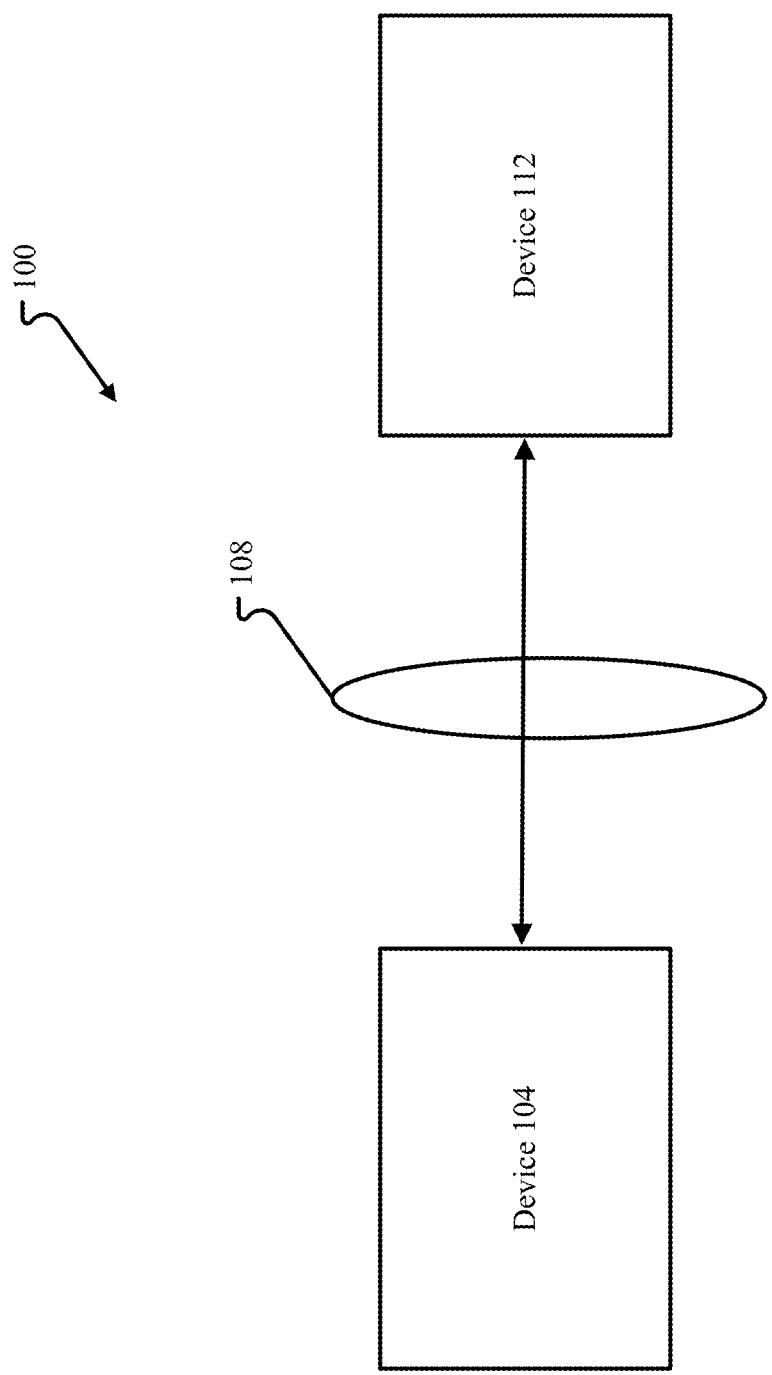
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Related art optical transceiver systems send and receive signals that have one polarization mode (e.g., transverse electric (TE) polarization), which limits capacity of the optical fibers carrying the signals to a number of signals than can be practicably multiplexed together in the single polarization mode. Inventive concepts, however, relate to increasing capacity of a fiber optic cable in a transmission system by transmitting multiple groups of optical signals with different polarization modes. Transmission over the fiber optic cable from a transmitter side to a receiver side may introduce random polarization to the optical signals traveling therethrough. As such, the receiver side should have the ability to distinguish between the multiple polarizations in order to correctly recover data or symbols carried by the optical signals. Accordingly, at least one example embodiment enables dual polarization recovery in a system that implements wavelength division multiplexing (WDM), where two groups of optical signals with different polarization modes upon transmission are recovered at the receiver side. In other words, a first group of optical signals and a second group of optical signals may each be transmitted with a number of different wavelengths, but at least one of the groups of optical signals includes at least one extra optical signal transmitted at an auxiliary wavelength.

For example, a first group of 1 to M number of optical signals may be transmitted in a first polarization mode with respective 1 to M different wavelengths and may include an additional Xth optical signal with the first polarization mode transmitted at its own wavelength. Meanwhile, a second group of 1 to N number of optical signals may be transmitted in a second polarization mode with respective 1 to N different wavelengths (the number N may be equal to the number M). At the receiver side, the Xth optical signal may function as a continuous-wave pilot signal, which the receiver recognizes as belonging to the first group of optical signals based on at least one signal characteristic (e.g., pilot symbols, frequency, coding, power) of the Xth optical signal previously known to the receiver and detected by the receiver. The receiver uses the knowledge of the at least one signal characteristic expected to be received and feedback indicative of the at least one signal characteristic of the Xth optical signal to control a polarization recovery block in a manner that properly recovers the first group of optical signals with the first polarization mode and the second group of optical signals with the second polarization mode. The recovered optical signals may be passed on to other receiver side components for further processing (e.g., data extraction).

FIG. 1 illustrates a system 100 according to at least one example embodiment. The system 100 may be part of a datacenter and may include a network device 104, a communication network 108, and a network device 112. In at least one example embodiment, network devices 104 and 112 may correspond a network switch (e.g., an Ethernet switch), a network interface controller (NIC), or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using optical signals.

Although not explicitly shown, the network device 104 and/or the network device 112 may include storage devices and/or processing circuitry for carrying out computing tasks, for example, tasks associated with controlling the flow of data within each network device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the network devices 104 and 112 include one or more communication interfaces for facilitating wired and/or wireless communication between one another and other unillustrated elements of the system 100.

As discussed in more detail below, each network device 104 and 112 may include one or more transmitters that transmit optical signals over the communication network 108 and one or more receivers that receive optical signals over the communication network 108.

Although not explicitly shown, it should be appreciated that devices 104 and 112 may include other processing devices, storage devices, and/or communication interfaces generally associated with computing tasks, such as sending and receiving data.

Figure 2:
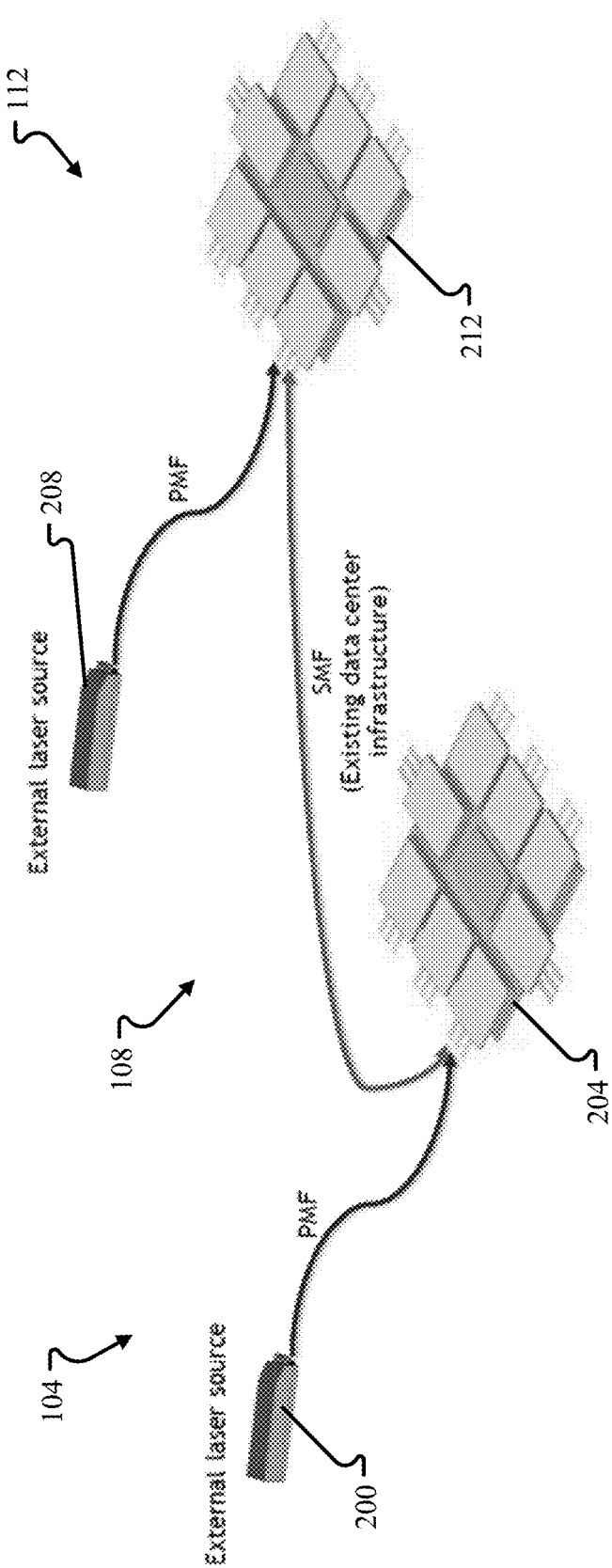
FIG. 2 illustrates various additional details for components in the system of FIG. 1 according to at least one example embodiment.

FIG. 2 illustrates various additional details for components in the system of FIG. 1 according to at least one example embodiment.

In FIG. 2, network device 104 may comprise a laser source 200 and a multichip module (MCM) 204 while network device 112 may comprise a laser source 208 and an MCM 212.

Each laser source 200 and 208 may include one or more lasers or other suitable light source(s) that emit light at one or more wavelengths. Each laser or light source may be capable of emitting modulated light (e.g., a vertical-cavity surface emitting laser (VCSEL)) or each laser source 200 and 208 may further comprise one or more modulators to modulate light emitted from each laser.

Each MCM 204 and 212 may include one or more core digital ASICs (e.g., electrical switches) surrounded by peripheral chips called satellite chips or chiplets. In the example of FIG. 2, MCMs 204 and 212 each have eight chiplets arranged around a central switching ASIC. Each chiplet may include components that enable conversion of optical signals to electrical signals for routing by the switching ASIC to other chiplets and conversion of electrical signals to optical signals for sending over the communication network 108. For example, each chiplet may include a transceiver (with transmitter driving circuitry and lens components and with receiver amplification circuitry and lens components), clock and data recovery circuitry, digital signal processing circuitry, serializer/deserializer (Serdes) circuitry, encryption and decryption circuitry, and/or an input/output interface (e.g., parallel I/O) that interfaces with the ASIC. Alternatively, one or more of the above listed items may be included on the ASIC.

As shown in FIG. 2, the optical links between each laser source 200 and 208 and a respective MCM 204 and 212 may comprise one or more polarization-maintaining fibers (PMFs) that maintain an optical signal's state of polarization (SOP) over the link. A PMF may have any suitable structure such as a PANDA configuration, an elliptical-clad configuration, and/or a bow-tie configuration. Here, it should be appreciated that the laser source 200 may be co-located with the MCM 204 in one datacenter while the laser source 208 and MCM 212 may be co-located in a remote datacenter. However, example embodiments are not limited to using PMFs as the link between each laser source 200 and 208 and a respective MCM 204 and 212, and SMFs may alternatively be employed as the link. In this case, the same or similar polarization recovery methods and devices described herein may be used at each MCM 204 and 212.

The optical link between MCMs 208 and 212 (e.g., an optical link of the communication network 108 between datacenters) may comprise one or more single-mode fibers (SMFs). In general, PMFs are more costly than SMFs, making it cost prohibitive to link MCMs 204 and 212 with PMFs, particularly over long distances (e.g., over 100 m). However, an SMF may introduce random birefringence to optical signals so that an optical signal received at an MCM has unknown polarization (e.g., random polarization). At least one example embodiment of the instant application relates to recovering and/or tracking polarization of received optical signals with unknown polarization while enabling substantially glitch-free operation with improved or maximized output power.

Here, it should be appreciated that FIG. 2 illustrates a specific implementation of the system 100 from FIG. 1, but example embodiments are not limited thereto and may be applied to any suitable system that exchanges optical signals between two endpoints over a waveguide that induces polarization changes to signals passing therethrough.

Figure 3:
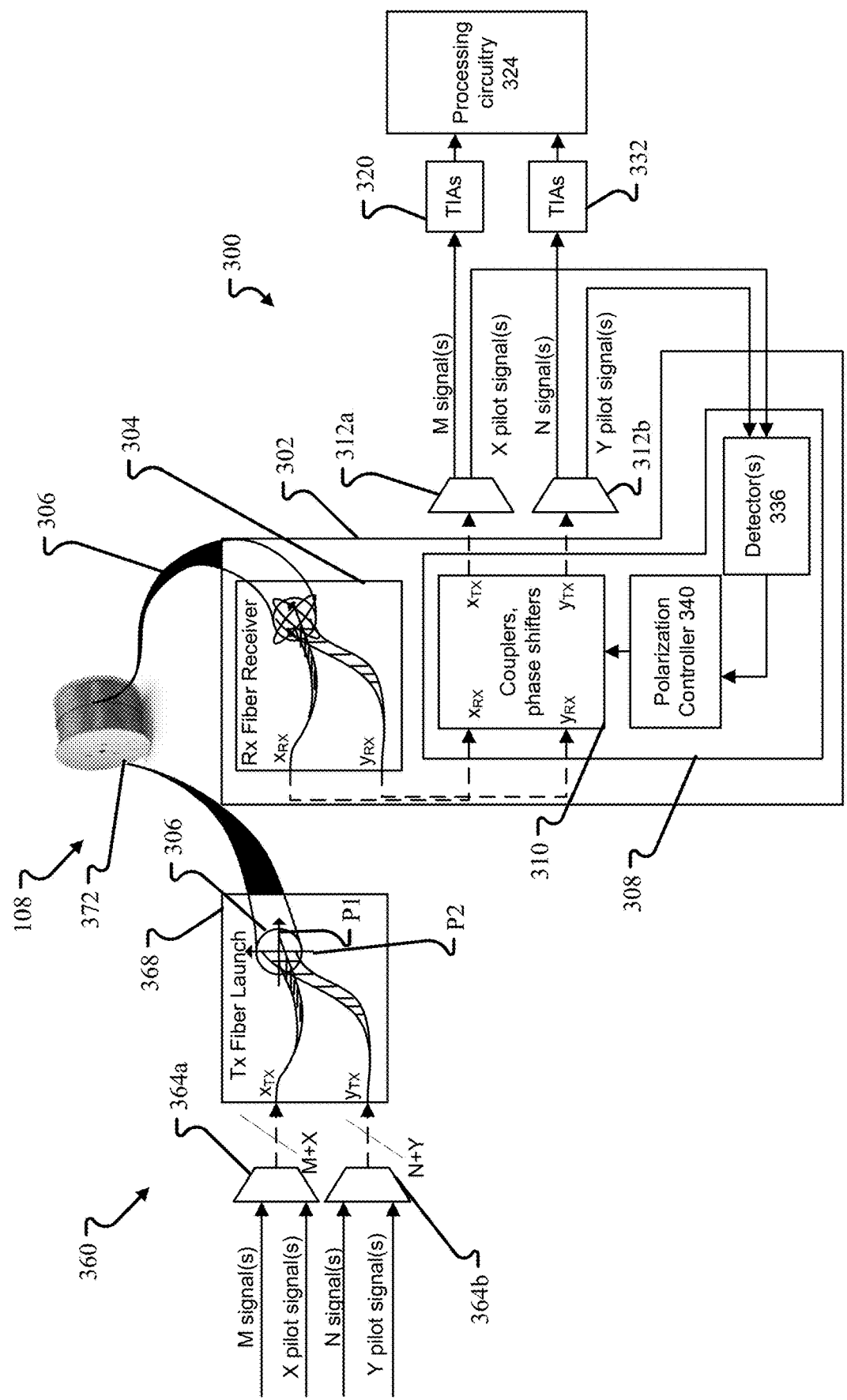
FIG. 3 illustrates a receiver and a transmitter according to at least one example embodiment.

FIG. 3 illustrates a receiver 300 and transmitter 360 according to at least one example embodiment. The receiver 300 may be included in one or more of the chiplets on MCM 204 and/or MCM 212 and the transmitter 360 may be included in one or more other chiplets that is sending signals to the receiver 300.

The transmitter 360 may include multiplexers (MUXes) 364a and 364b and a fiber launcher 368. In FIG. 3, solid lines input and output from elements represent electrical signals while dashed lines input and output from elements represent optical signals. As shown for the transmitter 360, a first group of electrical signals is input to MUX 364a. The first group of electrical signals may include M number of electrical signal(s) and X number of electrical signal(s). Meanwhile, a second group of electrical signals is input to MUX 364b. The second group of electrical signals may include N number of electrical signal(s) and Y number of electrical signal(s). Although not shown, the M, N, X, and/or Y electrical signals may originate from a part of the transmitter 360 that includes processing and/or storage systems for handling data.

The MUXes 364a and 364b may include suitable hardware and/or software for multiplexing signals and converting the received electrical signals into respective multichannel optical signals that includes a first group of optical signals M+X and a second group of optical signals N+Y. For example, the MUXes 364a and 364b may include a laser driven frequency comb and a bus of ring modulators that convert the received electrical signals into optical signals. However, example embodiments are not limited thereto and other or additional suitable components may be used to convert the electrical signals into optical signals. In any event, it should be appreciated that the MUXes 364a and 364b perform WDM operations to form multichannel optical signals input to the fiber launcher 368. The fiber launcher 368 may include a polarization rotator that rotates polarization of the multichannel optical signal comprising the M and X optical signals from MUX 364a into a first polarization mode or state P1 to form a first composite signal $X_{TX}$. The polarization rotator may further rotate polarization of the multichannel optical signal comprising the N and Y optical signals from MUX 364b into a second polarization mode or state P2 to form a second composite signal $Y_{TX}$. In at least one embodiment, the polarization modes P1 and P2 may have substantially opposite or orthogonal polarizations and may include one of right circular polarization and left circular polarization, linear +45 degrees polarization and linear −45 degrees polarization, vertical and horizontal polarization (e.g., TE and TM), and/or the like. The rotated composite optical signals $X_{TX}$ and $Y_{TX}$ may be combined by a combiner (e.g., a waveguide) of the fiber launcher 368 and output to an optical fiber 372 of the communication network 108 as a combined signal 306. Any suitable polarization rotator and combiner structure may be used to accomplish the above described rotating and combining functions of the fiber launcher 368. In at least one example embodiment, the M and N signals in the combined signal 306 have different wavelengths (as generated by the MUXes 364a and 364b) and/or may be interleaved with one another to reduce crosstalk. The number of optical signals in each of the composite signals $X_{TX}$ and $Y_{TX}$ may be between about 2 and about 20 (i.e., M is between 2 and 20 and N is between 2 and 20).

Here, it should be appreciated that the M and N optical signals output from the MUXes 364a and 364b are payload signals for transmitting data while the X and Y optical signals output from the MUXes 364a and 364b correspond to pilot signals used by the receiver 300 during a signal recovery process. Thus, the X and Y pilot signals are distinguishable from the M and N payload signals in at least one aspect. For example, the X and Y pilot signals may be transmitted with at least one signal characteristic that is distinguishable from the M and N payload signals. Such signal characteristics that distinguish a pilot signal from a payload signal may include frequency, coding, pilot symbols, power, or other suitable signal characteristic that is specific to the pilot signals. In at least one embodiment, the pilot signal(s) may be sent at different times than the payload signals to help distinguish between the two types of signals. The expected value(s) of the at least one signal characteristic may be known to both the receiver 300 and the transmitter 360.

As shown, the receiver 300 may include a recovery device 302 with a fiber receiver block 304 and a recovery block 308, a block of couplers and phase shifters 310, demultiplexers (DEMUXes) 312a and 312b, transimpedance amplifiers (TIAs) 320/332, and processing circuitry 324.

The fiber receiver block 304 may include an edge coupler, such as a polarization rotator-splitter (PRS), that splits and rotates the randomly polarized combined signal 306 from the optical fiber 372 into two composite signals $X_{RX}$ and $Y_{RX}$ of opposite polarizations (e.g., transverse electric (TE) and transverse magnetic (TM) polarization). The edge coupler may include any suitable structure for splitting the combined signal 306 into two components and rotating polarization of the two components into respective known polarizations to form composite signals $X_{RX}$ and $Y_{RX}$. In at least one embodiment, the fiber receiver block 304 comprises a 2D grating. Both composite signals $X_{RX}$ and $Y_{RX}$ having respective polarizations P1 and P2 are then output to the recovery block 308.

As discussed in more detail below, the recovery block 308 functions to recover the composite signals $X_{TX}$ and $Y_{TX}$ of combined signal 306 as originally transmitted to receiver 300 by transmitter 360. The recovery block 308 accomplishes this while also outputting signals to the DEMUXes 312a and 312b at or near the same signal power of the combined signal 306 input to the fiber receiver block 304 and while providing substantially glitch-free reset operations for phase shifters within the recovery block 308. In general, the fiber receiver block 304 and/or some or all components of the recovery block 308 are implemented with silicon photonics (SiP) where silicon or silicon based material is used as the optical medium for optical components of the fiber receiver block 304 and/or the recovery block 308. Additional components of the receiver 300 (and one or more components of the transmitter 360, such as the fiber launcher 368) may also be implemented with silicon photonics.

As shown in FIG. 3, the recovery block 308 includes the coupler/phase shifter block 310, detector(s) 336, and polarization controller 340. As shown in more detail in FIG. 4, the coupler/phase shifter block 310 may include a series of alternating components that comprise optical couplers and phase shifters. As discussed in more detail below, the couplers and phase shifters operate on the composite signals $X_{RX}$ and $Y_{RX}$ under control of the polarization controller 340 to output composite signals $X_{TX}$ and $Y_{RX}$, which should correspond to or closely correspond to the originally transmitted composite signals $X_{TX}$ and $Y_{TX}$ from the transmitter 360.

The DEMUXes 312a and 312b may receive and demultiplex the composite optical signals $X_{TX}$ and $Y_{TX}$ output from the recovery block 308 before passing demultiplexed signals to additional receiver circuitry that may include sets of TIAs 320 and 332. In addition, the DEMUXes 312a and 312b may convert the received optical signals into electrical signals suitable for processing by the processing circuitry 324. Thus, the DEMUXes 312a and 312b may include suitable hardware and/or software for carrying out optical-to-electrical conversion and demultiplexing functions. In at least one embodiment, the DEMUXes 312a and 312b include an optical bus comprising ring filters for separating optical signals, photodiodes for detecting the optical signals, and/or the like. FIG. 3 further illustrates that the M and N signals output from DEMUXes 312a and 312b (now electrical signals) are input to respective sets of TIAs 320 and 332 that amplify and pass the signals to processing circuitry 324 which recovers data modulated onto the M and N signals at the transmitter 360. The processing circuitry 324 may include the same or similar processing circuitry as that described above with reference to FIG. 1.

Here, it should be appreciated that one of the DEMUXes 312a or 312b may be bypassed or omitted if, for example, one of the signals $X_{TX}$ or $Y_{TX}$ output from the recovery block 308 has a single wavelength (e.g., N is equal to 1 and Y is equal to 0 at the transmitter 360). In other words, the DEMUXes 312a and 312b are useful for demultiplexing a WDM signal that has multiple wavelengths. However, example embodiments also apply systems that do not implement WDM for both signals $X_{TX}$ and $Y_{TX}$.

Figure 4:
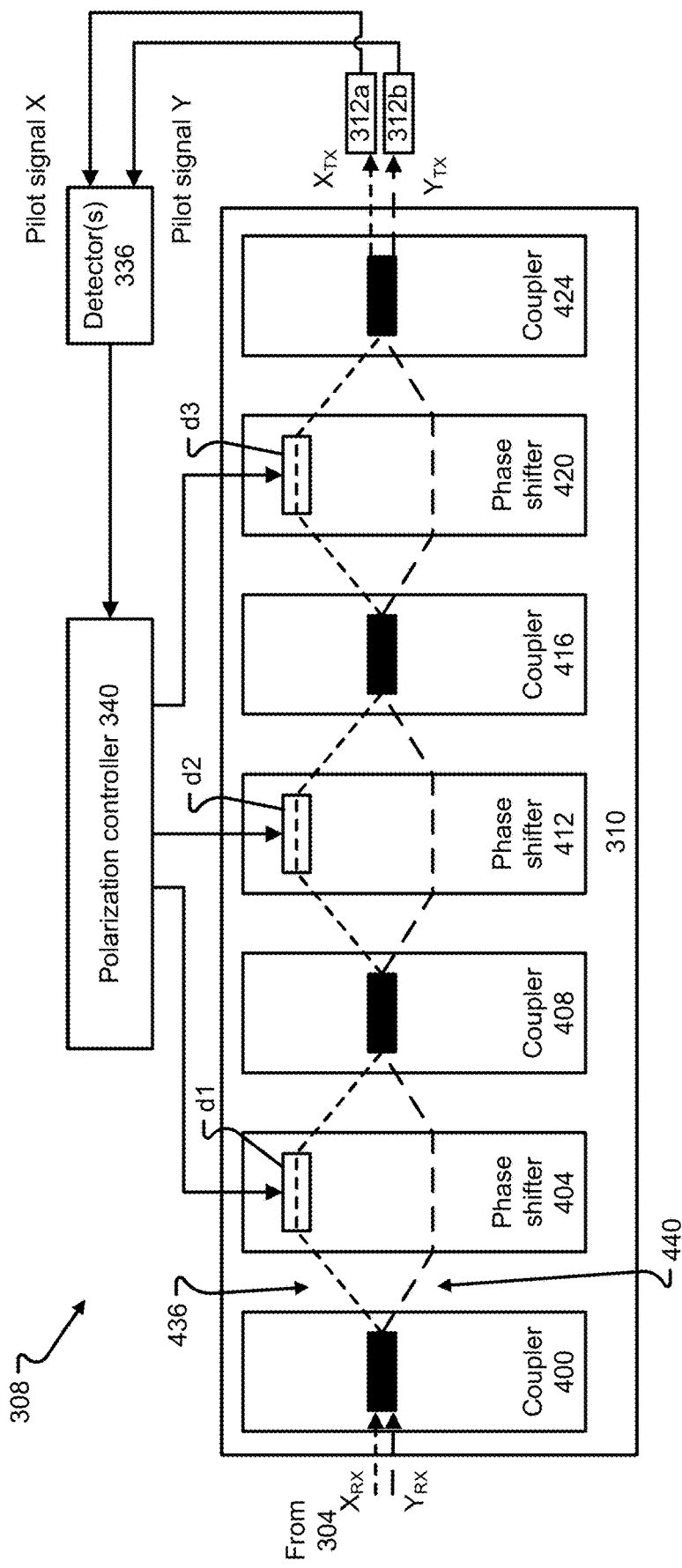
FIG. 4 illustrates the recovery device from FIG. 3 in more detail according to at least one example embodiment.

As shown in FIG. 3 and discussed in more detail below, the polarization controller 340 utilizes feedback from one or both pilot signals X and/or Y fed to the polarization controller 340 through one or more detectors 336. FIG. 4 illustrates and discusses additional example details of the recovery block 308 and the feedback.

FIG. 4 illustrates the recovery block 308 from FIG. 3 in more detail according to at least one example embodiment. As shown, the coupler/phase shifter block 310 comprises couplers 400, 408, 416, and 424 and phase shifters 404, 412, and 420 coupled to waveguide sections 436 and 440. The recovery block 308 further includes the detector(s) 336 and the polarization controller 340 from FIG. 3.

The couplers 400, 408, 416, and 424 may comprise optocouplers (illustrated with solid black rectangles), for example, 3 dB couplers for coupling two input optical signals to generate corresponding output optical signals. The coupler 400 receives the composite signals $X_{TX}$ and $Y_{TX}$ from the fiber receiver block 304 in FIG. 3.

The phase shifters 404, 412, and 420 may comprise thermo-optical phase shifters (or heaters) that change the phase of a signal passing through a waveguide with heat generated by one or more electrodes (illustrated by transparent rectangles) that receive electrical signals from the polarization controller 340. For example, each phase shifter 404, 412, and 420 is controlled to introduce a respective phase shift d1, d2, or d3 on the optical signal passing through waveguide section 436. In the example of FIG. 4, d1, d2, and d3 may be phase shift values that range from 0 to 2π.

Although FIG. 4 illustrates that the phase shifters 404, 412, and 440 apply phase shifts to signals passing through waveguide section 436, it should be appreciated that additional electrodes may be placed in the path of waveguide section 440, if desired, in order to enable adjustments for the signals passing through waveguide section 440. Here, it should be appreciated that example embodiments are not limited to thermo-optical phase shifters and that other suitable phase shifters may be used (e.g., waveplates). In addition, more or fewer couplers and/or phase shifters may be included depending on design preferences.

With reference to FIGS. 3 and 4, the detector(s) 336 may include one or more detectors for detecting at least one signal characteristic of the pilot signals X and/or Y output from the DEMUXes 312a and 312b (signals M and N not shown in FIG. 4). As noted above, the pilot signals X and/or Y output from the DEMUXes 312a and 312b may be electrical signals indicative of at least one signal characteristic such as frequency, code, power, and/or the like that is distinguishable from the M and N signals. Thus, the detectors 336 may include hardware and/or software for detecting frequency, code, power, and/or the like of the pilot signals X and/or Y. Although the detector(s) 336 are illustrated as an entity separate from the polarization controller 340 and the DEMUXes 312a and 312b, the detector(s) 336 may be integrated with the polarization controller 340 and/or the DEMUXes 312a and 312b. For example, if the detector(s) 336 comprise one or more photodiodes or other photosensors for detecting light, then such photosensors may be integrated with the DEMUXes 312a and 312b that convert the received X and Y optical pilot signals to electrical signals.

The polarization controller 340 may comprise the same or similar processing circuitry as that described above with reference to FIG. 1. In general, the polarization controller 340 receives feedback from the detector(s) 336 and generates control signals (e.g., voltage signals) that are applied to one or more of the phase shifters 404, 412, and 420 based on the feedback. For example, the polarization controller 340 controls the phase shifters 404, 412, and 420 based on the feedback so that the at least one signal characteristic of pilot signal X is maximized. If pilot signal Y is also used, then the polarization controller 340 may control the phase shifters 404, 412, and 420 based on the feedback so that the at least one signal characteristic of one of the pilot signals X or Y is maximized while the at least one signal characteristic of the other one of pilot signals X or Y is minimized. In at least one embodiment, the pilot signals X and Y include pilot symbols known to both the receiver 300 and the transmitter 360 so that the polarization controller 340 uses the feedback from detectors 336 to adjust the control signals applied to the phase shifters 404, 412, and/or 420 in manner that maximizes or minimizes the pilot symbols.

As may be appreciated, using feedback from the detectors 336 to adjust one or more signal characteristics of a pilot signal X or Y at the output of the recovery block 308 has the practical effect of also adjusting one or more signal characteristics of the M and N payload signals. In other words, the polarization and signal characteristics of the M and N payload signals are correctly recovered by the recovery block 308 as a natural consequence of the polarization controller 340 acting on information provided by the feedback of a single pilot signal from the combined signal 306 or multiple pilot signals from the combined signal 306. For example, consider an example where it is desired to maximize output power of the signals at the output of the recovery block 308 using a single pilot signal X. In this case, controlling the phase shifters 404, 412, and 420 to maximize output power of pilot signal X at the output of the recovery block 308 based on feedback of pilot signal X through the detectors 336 has the automatic effect of also maximizing output power of the M payload signals that were originally transmitted with pilot signal X since the M payload signals are traveling through the same waveguide section 436 as pilot signal X. Meanwhile, as a natural consequence of maximizing output power of the pilot signal X traveling through waveguide section 436, the output power of the N payload signals traveling through waveguide section 440 is also maximized. In other words, causing a particular change to a signal characteristic of a signal traveling through one waveguide section 436 or 440 may in turn causes a corresponding change on the same signal characteristic of a signal traveling through the other waveguide section 436 or 440. Although the above example assumes a single pilot signal X, additional pilot signals, like pilot signal Y, may be used to provide the polarization controller 340 with even more robust feedback information that may be used to further improve performance of the recovery block 308.

Here, it should be appreciated that for the recovery block 308 includes three degrees of freedom for efficiently recovering signals $X_{RX}$ and $Y_{RX}$ while avoiding glitchy reset operations. In general, reset operations are used for polarization recovery devices with thermo-optical phase shifters because these devices operate within limited phase (voltage) ranges. For example, a reset operation for a phase shifter may be performed when the phase shifter is operating or about to operate near, at, and/or over the capability of the phase shifter and/or some other component of the recovery block 308. For example, the polarization controller 340 initiates a reset operation for a phase shifter upon detecting that a next step up or next step down in the voltage being applied to the electrode of a phase shifter will be exceed a maximum or a minimum possible voltage that the electrode can receive to induce a known phase on the signal (where the maximum and minimum possible voltages may be determined based on the thermal limit of the phase shifter and/or limits of the power supply applying the voltage to the electrode of the phase shifter).

Each degree of freedom of the recovery block 308 may perform a function related to correctly recovering the signals input to the receiver 300. In FIG. 4, for example, a first degree of freedom is made up of phase shifter 412 while a second degree of freedom is made up of phase shifter 420 and couplers 416 and 424. In general, a polarized optical field of the signal input to the receiver 300 may be expressed as:

$$\vec{E} = \sqrt{P}\begin{bmatrix} \cos(\theta)e^{-j\phi} \\ \sin(\theta) \end{bmatrix},$$

where P relates to signal power, $\theta$ relates to power ratio, and where $\phi$ relates to phase difference.

In operation, phase shifter 412 may assist with removing the relative phase difference between two signals while phase shifter 420 sets the power ratio between two signals. However, a recovery block with only these two degrees of freedom may suffer from reset operations that cause the recovery block to temporarily have reduced output power which reduces performance of the system. This temporary change in output power (i.e., a glitch) may be mitigated using forward error correction (FEC) and/or heuristics, however, these methods may not efficiently and/or correctly recover of data from the input signal. Accordingly, the recovery block 308 in FIG. 4 includes an auxiliary (third) degree of freedom associated with phase shifter 404. The auxiliary degree of freedom may be made up of phase shifter 404 and couplers 400 and 408. In the example of FIG. 4, the phase shifter 404 may be operated by the polarization controller 340 to substantially prevent or reduce the loss of output power at the output of the recovery block 308 during a reset operation for phase shifter 412 and/or phase shifter 420, thereby allowing for substantially glitch-free reset operations of the recovery block 308 (e.g., reset operations that do not significantly alter output power of signal Eu of the recovery block 308). As a result of the system being substantially glitch-free, the system may avoid the power and computing resource consumption used for FEC and/or heuristics.

FIG. 5 illustrates a method 500 according to at least one example embodiment. The method 500 may be performed by the recovery block 308 in FIG. 4 of the recovery device 302 to achieve glitch-free reset operations.

Operation 504 includes initiating polarization recovery for the recovery block 308 in FIG. 4. For example, the polarization controller 340 applies initial control signals to phase shifters 412 and 420 to eliminate the relative phase difference between the two signals introduced to respective waveguide sections 436 and 440 and to maximize output power of the signals $X_{RX}$ and $Y_{RX}$ at the output of the recovery block 308.

Operation 508 includes determining whether a reset operation should be performed. For example, the polarization controller 340 determines whether a reset operation should be performed for phase shifter 412 and/or phase shifter 420. If not, the method proceeds to operation 512. If so, the method proceeds to operation 516.

In at least one embodiment, determining whether the reset operation should be performed includes monitoring one or more factors associated with the phase shifter 412 and/or the phase shifter 420. The one or more factors may include factors associated with temperature, time, value of a phase shift being introduced by a phase shifter, a control signal being applied to the electrode(s) of a phase shifter to cause the phase shift, and/or the like. For example, the polarization controller 340 may monitor the temperature of the phase shifters 412 and 420 using one or more temperature sensors and determine to reset a phase shifter when a sensed temperature of that phase shifter is greater than a threshold temperature. In another example, the polarization controller 340 may track an amount of time since the previous reset operation for a phase shifter (or an amount of time since the initiation of operation 504) and determine that a next reset operation for that phase shifter should be performed when the amount of time is greater than a threshold amount of time. In yet another example, the polarization controller 340 may track the phase value d2 and/or d3 and determine that the phase shifter should be reset when a value of d2 and/or d3 approaches the limit(s) set for d2 and/or d3. Still further, the polarization controller 340 may track the control signals V2 and/or V3 and determine that a phase shifter should be reset when a value of V2 and/or V3 exceeds a maximum and/or minimum voltage threshold. Here, it should be appreciated that the threshold temperature, the threshold amount of time, the phase value limits, and/or threshold voltage values may be design parameters set based on empirical evidence (e.g., historical data) and/or preference. In addition, any suitable combination of the above factors may be used to determine when to perform a reset operation. In at least one embodiment, the polarization controller 340 updates one or more reset flags after each reset operation and employs hysteresis to avoid infinite concurrent resets that may occur due to noise (e.g., noisy feedback measurements) and/or other anomaly within the system. In this case, the polarization controller 340 may employ hysteresis to avoid performing multiple resets caused by the noise or other anomaly.

Operation 512 includes performing normal operation of the recovery block 308 when the determination is operation 508 is 'no.' For example, operation 512 may include the polarization controller 340 monitoring feedback of the recovery block 308 through detectors 336 and generating control signals for electrodes of the phase shifters 412 and/or 420 that remove (or reduce) the relative phase difference between signals input to phase shifter 412 and/or that maximize (or increase) output power of signals $X_{RX}$ and signals $Y_{RX}$ at the output of the recovery block 308. In one embodiment, the polarization controller 340 implements a gradient ascent algorithm to maximize the power of signals at the output of the recovery block 308. However, example embodiments are not limited thereto, and other suitable algorithms may be used for the same or similar purpose.

Operation 516 includes performing a reset operation for the recovery block 308 when the determination in operation 508 is 'yes.' For example, the polarization controller 340 generates and applies control signals to phase shifters 404, 412, and 420 in a manner that increases or maximizes power of signal $X_{RX}$ and $Y_{RX}$.

In view of the foregoing, it should be appreciated that example embodiments relate to increasing capacity of a fiber optic cable in a transmission system by transmitting multiple groups of optical signals with different polarization modes. A polarization recovery device uses knowledge about one or more pilot signals transmitted with at least one of the groups of optical signals and feedback indicative of the at least one signal characteristic of the pilot signal to a recovery block 308 in a manner that properly recovers the groups of optical signals with different polarization modes. The properly recovered optical signals may be passed on to other receiver side components for further processing (e.g., data extraction).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

What is claimed is:

1. A system, comprising:
 a transmitter that generates a combined signal including a first group of optical signals and a second group of optical signals, the first group of optical signals comprising M+X number of optical signals in a first polarization mode, the second group of optical signals comprising N number of optical signals in a second polarization mode, wherein the number of N and M optical signals comprise payload signals, wherein the X number of optical signals comprises at least one first pilot signal; and
 a receiver comprising a polarization recovery device including:
  a plurality of couplers and a plurality of phase shifters alternately connected in series; and
  a polarization controller that controls the plurality of phase shifters, wherein the polarization recovery device receives the combined signal and recovers, from the combined signal, the first group of optical signals with the first polarization mode and the second group of optical signals with the second polarization mode based on feedback indicative of at least one signal characteristic of the at least one first pilot signal.

2. The system of claim 1, wherein X is equal to 1.

3. The system of claim 2, wherein the second group of optical signals comprises N+Y number of optical signals in the second polarization mode, wherein the Y number of optical signals comprises at least one second pilot signal, and wherein the feedback is further indicative of at least one signal characteristic of the at least one second pilot signal.

4. The system of claim 3, wherein Y is equal to 1.

5. The system of claim 1, wherein each optical signal in the first group of optical signals has a different wavelength, and wherein each optical signal in the second group of optical signals has a different wavelength.

6. The system of claim 1, wherein the polarization recovery device further comprises:
 a polarization rotator-splitter that splits the combined signal into a first set of signals that traverse a first path that includes a first waveguide section within the polarization recovery device and a second set of signals that traverse a second path that includes a second waveguide section within the polarization recovery device.

7. The system of claim 6, wherein the polarization controller controls the plurality of phase shifters to adjust at least one signal characteristic of the first set of signals along the first path or the second set of signals along the second path based on the feedback.

8. The system of claim 1, wherein the first polarization mode and the second polarization mode have opposite polarization orientations.

9. The system of claim 8, wherein the opposite polarization orientations include one of: left and right polarization, vertical and horizontal polarization, or +45° and −45° polarization.

10. The system of claim 1, wherein the polarization recovery device further comprises a polarization rotator-splitter, and wherein a first coupler of the plurality of couplers is positioned between the polarization rotator-splitter and a first phase shifter of the plurality of phase shifters.

11. A polarization recovery device, comprising:
 an input that receives a combined signal including a first group of optical signals and a second group of optical signals having respective unknown polarization modes, the first group of optical signals comprising M+X number of optical signals, the second group of optical signals comprising N number of optical signals, wherein the number of N and M optical signals comprise payload signals, wherein the X number of optical signals comprises at least one first pilot signal;
a recovery block including:
   a plurality of couplers and a plurality of phase shifters alternately connected in series; and
   a polarization controller that controls the plurality of phase shifters, wherein the recovery block recovers, from the combined signal, the first group of optical signals with a first polarization mode and the second group of optical signals with a second polarization mode based on feedback indicative of at least one signal characteristic of the at least one first pilot signal; and
an output that outputs the first group of optical signals with the first polarization mode and the second group of optical signals with the second polarization mode.

12. The polarization recovery device of claim 11, wherein X is equal to 1.

13. The polarization recovery device of claim 12, wherein the second group of optical signals comprises N+Y number of optical signals in the second polarization mode, wherein the Y number of optical signals comprises at least one second pilot signal, and wherein the feedback is further indicative of at least one signal characteristic of the at least one second pilot signal.

14. The polarization recovery device of claim 13, wherein Y is equal to 1.

15. The polarization recovery device of claim 11, wherein each optical signal in the first group of optical signals has a different wavelength, and wherein each optical signal in the second group of optical signals has a different wavelength.

16. The polarization recovery device of claim 11, wherein the polarization recovery device further comprises:
   a polarization rotator-splitter that splits the combined signal into a first set of signals that traverse a first path that includes a first waveguide section within the polarization recovery device and a second set of signals that traverse a second path that includes a second waveguide section within the polarization recovery device.

17. The polarization recovery device of claim 16, wherein the polarization controller controls the plurality of phase shifters to adjust at least one signal characteristic of the first set of signals along the first path or the second set of signals along the second path based on the feedback.

18. The polarization recovery device of claim 11, wherein the first polarization mode and the second polarization mode have opposite polarization orientations.

19. The polarization recovery device of claim 18, wherein the opposite polarization orientations include one of: left and right polarization, vertical and horizontal polarization, or +45° and −45° polarization.

20. The polarization recovery device of claim 11, wherein the recovery block further comprises a polarization rotator-splitter, and wherein a first coupler of the plurality of couplers is positioned between the polarization rotator-splitter and a first phase shifter of the plurality of phase shifters.

* * * * *